(12) United States Patent
Price

(10) Patent No.: US 10,520,577 B2
(45) Date of Patent: Dec. 31, 2019

(54) METHODS AND DEVICES FOR DETERMINING AND SAVING LOCATION INFORMATION

(71) Applicant: Steel Shad Fishing Company LLC, East Dorset, VT (US)

(72) Inventor: Stephen Price, East Dorset, VT (US)

(73) Assignee: Steel Shad Fishing Company LLC, East Dorset, VT (US)

( * ) Notice: Subject to any disclaimer, the term of this patent is extended or adjusted under 35 U.S.C. 154(b) by 0 days.

(21) Appl. No.: 16/203,035

(22) Filed: Nov. 28, 2018

(65) Prior Publication Data

US 2019/0162813 A1 May 30, 2019

Related U.S. Application Data

(60) Provisional application No. 62/592,180, filed on Nov. 29, 2017, provisional application No. 62/599,414, filed on Dec. 15, 2017.

(51) Int. Cl.
*H04W 4/00* (2018.01)
*G01S 5/00* (2006.01)
(Continued)

(52) U.S. Cl.
CPC ............ *G01S 5/0027* (2013.01); *G01S 19/42* (2013.01); *G06F 16/29* (2019.01); *H04W 4/029* (2018.02); *H04W 4/80* (2018.02)

(58) Field of Classification Search
CPC ... A63B 21/00178; G06Q 40/08; H04W 4/38; H04W 76/02; H04W 4/046;
(Continued)

(56) References Cited

U.S. PATENT DOCUMENTS

| 5,420,592 A | 5/1995 | Johnson |
| 6,392,592 B1 | 5/2002 | Johnson et al. |

(Continued)

FOREIGN PATENT DOCUMENTS

| KR | 20070093507 B1 | 9/2007 |
| KR | 1020150098359 A | 8/2015 |
| KR | 20160130609 A1 | 11/2016 |

OTHER PUBLICATIONS http://www.beancotech.com/amotes/whatitis (2014).
(Continued)

*Primary Examiner* — Phuoc H Doan
(74) *Attorney, Agent, or Firm* — Downs Rachlin Martin PLLC

(57) ABSTRACT

Aspects of the present disclosure include devices configured for wireless communication with a mobile computing device having GPS capability that allow a user to record the user's current location with the user's mobile computing device without having to physically access the mobile computing device. Such devices can allow a user to mark or record a location or waypoint to a mobile computing device, such as a GPS-enabled mobile phone, using a wireless remote and software configured to enable communication with the mobile computing device. Such devices can enable a user to mark and record locations for navigation without having to physically touch and operate the mobile computing device.

16 Claims, 3 Drawing Sheets

(51) Int. Cl.
*H04W 4/029* (2018.01)
*G01S 19/42* (2010.01)
*G06F 16/29* (2019.01)
*H04W 4/80* (2018.01)

(58) Field of Classification Search
CPC ... B60R 25/406; G07C 9/00309; H04L 67/34; H04L 67/125
USPC ..... 340/572.1, 854.3; 455/456.5, 411, 404.1; 342/357
See application file for complete search history.

(56) References Cited

U.S. PATENT DOCUMENTS

| | | |
|---|---|---|
| 6,791,477 B2 | 9/2004 | Sari et al. |
| 7,538,511 B2 | 5/2009 | Samek |
| 7,898,471 B2 | 3/2011 | Guo |
| 8,392,118 B2 | 3/2013 | Korn et al. |
| 8,559,936 B2 | 10/2013 | Faenger |
| 8,761,976 B2 | 6/2014 | Salmon et al. |
| 9,697,727 B2 | 7/2017 | Chen et al. |
| 2009/0186628 A1 | 7/2009 | Yonker et al. |
| 2009/0186633 A1 | 7/2009 | Yonker et al. |
| 2010/0302037 A1* | 12/2010 | Schnell ............ G06K 7/0008 340/572.1 |
| 2012/0037088 A1 | 2/2012 | Altenhofen |
| 2014/0106734 A1 | 4/2014 | Lee |
| 2014/0336854 A1 | 11/2014 | Salmon et al. |
| 2017/0255200 A1 | 9/2017 | Arbuckle et al. |

OTHER PUBLICATIONS http://www.holux.com/JCore/products/products_content.jsp?pno=394 (Last viewed Sep. 20, 2017).
https://bad-elf.com/pages/be-gps-2300-detail (Last viewed on Nov. 1, 2018).
http://www.davoice.net/cell-phone/phone-remote-control-iphone-6-plus-5s-5c-5-4s-4-bluetooth/ (2015).
The Edge Remote Control, https://buy.garmin.com/en-US/US/p/146078 (Last viewed Sep. 20, 2017).
Bill Ray, "Just What You Needed: A Cell Phone With a Remote Control. No, Really." The Register at https://www.theregister.co.uk/2012/11/21/bluetooth_remote/ (Nov. 21, 2012).
Garmin Edge Remote Programable Third Button Uses? https://forums.garmin.com/forum/into-sports/cycling/edge-1000-aa/61872 (Sep. 28, 2017).
https://www8.garmin.com/manuals/webhelp/edge1000/EN-US/GUID-32FA81CA-D70A-4 . . . (Sep. 28, 2017).
Garmin Edge Remote Instructions Manual (Jul. 2014).
GPS & Maps: Track Coordinates, Compass + Waypoints on the App Store, by 2kit consulting. https://itunes.apple.com/us/app/gps-maps-track-coordinates-compass-waypoints/id477998 . . . (Last viewed on Sep. 28, 2017).
Humminbird AS RC1—Bluetooth Remote Control and Dongle, by Johnson Outdoors Family (2018).

* cited by examiner

US 10,520,577 B2

METHODS AND DEVICES FOR DETERMINING AND SAVING LOCATION INFORMATION

RELATED APPLICATION DATA

This application claims the benefit of priority of U.S. Provisional Patent Application Ser. No. 62/592,180, filed Nov. 29, 2017, and titled "Methods And Devices For Determining And Saving Location Information And Waypoints For Navigation," and U.S. Provisional Patent Application No. 62/599,414, filed Dec. 15, 2017, and titled "Methods And Devices For Determining And Saving Location Information And Waypoints For Navigation," each of which is incorporated by reference herein in its entirety.

FIELD OF THE INVENTION

The present invention generally relates to the field of determining and saving location information. In particular, the present invention is directed to remotes and mobile computing devices for remotely determining and saving location information.

BACKGROUND

Currently, a user can mark a current geographic location on a mobile computing device, such as a mobile phone. However, there are times when a user may wish to mark or record a location without having hands-on access to the mobile computing device.

SUMMARY OF THE DISCLOSURE

In one implementation, the present disclosure is directed to a method of saving a current geographic location of a mobile computing device with a wireless remote while performing an activity, the wireless remote including an operation unit operably connected to a wireless transmission unit, the mobile computing device including a wireless communication unit, a GPS sensor, a memory, and a processor configured to execute a remote integration application and a GPS application. The method includes pressing the operation unit; sending, with the wireless transmission unit, a control signal to the mobile computing device in response to pressing the operation unit; receiving, with the wireless communication unit at the mobile computing device, the control signal; processing, with the remote integration application, the control signal to determine at least one instruction; performing the at least one instruction with the GPS application, wherein said performing includes: receiving, from the GPS sensor, GPS coordinates of a current location of the mobile computing device; and storing the GPS coordinates in the memory.

In another implementation, the present disclosure is directed to a mobile computing device. The device includes a wireless communication unit; a processor; a memory; a global positioning system (GPS) sensor; and a non-transitory machine-readable storage medium containing machine-readable instructions configured to cause the processor to perform operations comprising: receiving, with the wireless communication unit, a control signal from a wireless remote; processing, the control signal to determine at least one instruction; performing the at least one instruction with a GPS application, wherein said performing includes: receiving, from the GPS sensor, GPS coordinates of a current location of the mobile computing device; and storing the GPS coordinates in the memory.

In yet another implementation, the present disclosure is directed to a wireless remote. The wireless remote includes a wireless transmission unit; an operation unit configured to generate an operation unit signal in response to a user input; and a control unit configured to transmit, with the wireless transmission unit, a unique ID and a control signal to a mobile computing device in response to receipt of the operation unit signal, wherein the unique ID and control signal are designed and configured to be processed by a remote integration application operated by the mobile computing device, the remote integration application configured to determine at least one instruction for a GPS application operated by the mobile computing device, wherein the at least one instruction includes storing GPS coordinates of a location of the mobile computing device.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
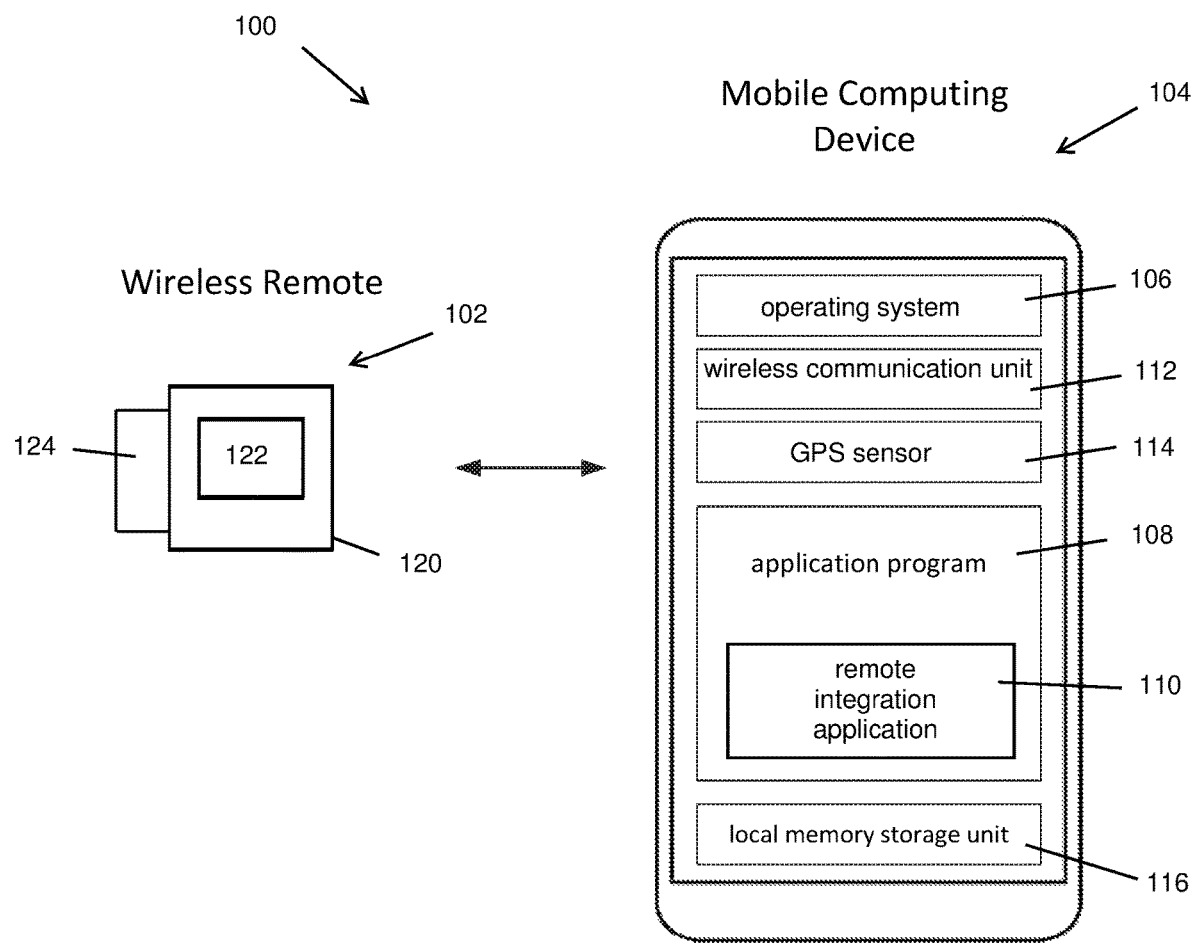
FIG. 1 illustrates an example GPS location system that includes a wireless remote and a mobile computing device.

Aspects of the present disclosure include devices configured for wireless communication with a mobile computing device having GPS capability that allow a user to record the user's current location with the user's mobile computing device 104 without having to physically access the mobile computing device. Such devices can allow a user to mark or record a location or waypoint to a mobile computing device, such as a GPS-enabled mobile phone or a GPS-enabled navigational system in a car or a boat, using a wireless remote and software configured to enable communication with the mobile computing device. Such devices can enable a user to mark and record locations for navigation without having to physically touch and operate the mobile computing device.

In one example, a remote device is configured for wireless communication using any one of a variety of communication protocols and technologies including, for example, one or more of Bluetooth®, BLE, Near Field Communication, Wi-Fi™, ZigBee®, Z-Wave, 6LoWPAN, Thread, WiFi-ah (HaLow), RFID, etc. and the remote device is configured for controlling a GPS-enabled mobile computing device to perform one or more operations including saving a current geographic location, also referred to herein as a waypoint for, e.g., navigational purposes. In some examples, a wired remote can be used that has a hard-wired connection to the mobile computing device.

In some examples, a wireless remote may be configured as a wearable device and can be configured to be worn, for example, on a lanyard around a user's neck, on a strap around a user's wrist, etc. so that it can be easily accessed for marking or recording a current location to the user's mobile computing without having to physically access the mobile device. This can be useful in a variety of applications, such as while driving a boat, car or motorcycle, where a user's attention and hands are required for driving. Such devices can also be useful while fishing, diving or hunting, where a user may wish to quickly save a current location, such as where he caught a fish, where he began a dive, or where he installed a hunting stand, etc. Such devices can also be useful while walking around inside or outside one's home and wanting to mark locations while not being physically in contact with the mobile computing device 104. Such devices can also be useful for counting a number of locations or waypoints marked while fishing, hunting, hiking or driving which can be useful to the user.

In one aspect, devices made in accordance with the present disclosure include electronics for use in the outdoors for the purposes of marking and navigating back to a specific location. As noted above, examples of uses can include use of a remote for wireless communication with a mobile computing device to: (i) mark and record and navigate back to a location for fishing, diving or driving while on a boat in a lake, river or ocean; (ii) mark and record and navigate back to a location for hunting, hiking, bird watching or viewing wildlife in the outdoors such as a forest, field or park; (iii) mark and record and navigate back to a location near a user's home such as to find a property boundary or well or septic system for example; and (iv) mark and record and navigate back to a location while driving an automobile, motorcycle, all-terrain vehicle or recreational vehicle (camper).

There are many situations where the use of a wireless remote to mark and record a location with a mobile computing device is preferable to manually marking the location with the mobile computing device itself. For example, when the mobile device must be stored safely to prevent damage or injury to the user, which is often the case while driving a boat, car, motorcycle or all-terrain vehicle or recreational vehicle.

In another aspect, devices made in accordance with the present disclosure include electronics for use in the outdoors for the purposes of marking specific locations for navigation and counting the number of locations or waypoints marked during a trip or during a 24-hour period using the devices. As noted above, examples of uses can include use of a remote for wireless communication with a mobile computing device to (i) mark and record locations for fishing, diving or driving in a boat and to count the number of locations or waypoints marked during the trip which could be useful for counting the number of fish caught during a trip or the number of dives made during a trip; (ii) mark and record locations for hunting, bird watching or viewing wildlife and to count the number of locations marked during a trip in order to count the number of locations or birds or animals seen during a trip or outing; (iii) mark and record locations around a user's home and to count the number of locations marked around one's home in order to mark property boundaries or specific sites on one's property; and (iv) mark and record locations while driving an automobile, motorcycle, all-terrain vehicle or recreational vehicle (camper) and to count the number of locations marked in order to count the number of stops or important locations seen during a trip or outing.

In some examples, a specifically designed and dedicated wireless remote configured for wireless communication, such as Bluetooth® communication may be configured to receive one or more of an audible (voice) or physical command (touch) from a user and in response, send a wireless waypoint command to a GPS-enabled mobile computing device. The wireless remote may include at least one button, and in some examples, only one button, for receiving a command from a user. In some examples, the wireless remote may include a sensor, such as a microphone for receiving an audible command from a user.

In one example, a GPS-enabled device may include software configured to process one or more signals received from a wireless remote such as a waypoint signal, and in response, cause a GPS software application on the mobile device to save a current location. In one example, the wireless remote software can be added to a commercially available device, such as downloaded to a mobile phone for use with one or more GPS applications on the mobile phone such as, for example, a Google Maps® application programming interface (API). In another example, the wireless remote software can be added to a commercially available device, such as a navigational system installed in a car or on a boat or on a motorcycle or in a recreational vehicle.

FIG. 1 shows an example GPS location system 100 that includes a wireless remote 102 and a mobile computing device 104. The present disclosure encompasses wireless remotes that are configured to work with virtually any mobile computing device 104 with GPS capability. Examples of mobile computing device 104s with GPS capability include, for example, mobile phones, dedicated mobile GPS units, navigation systems for, e.g., cars or boats, and depth finders or sonar devices for boats.

Figure 2:
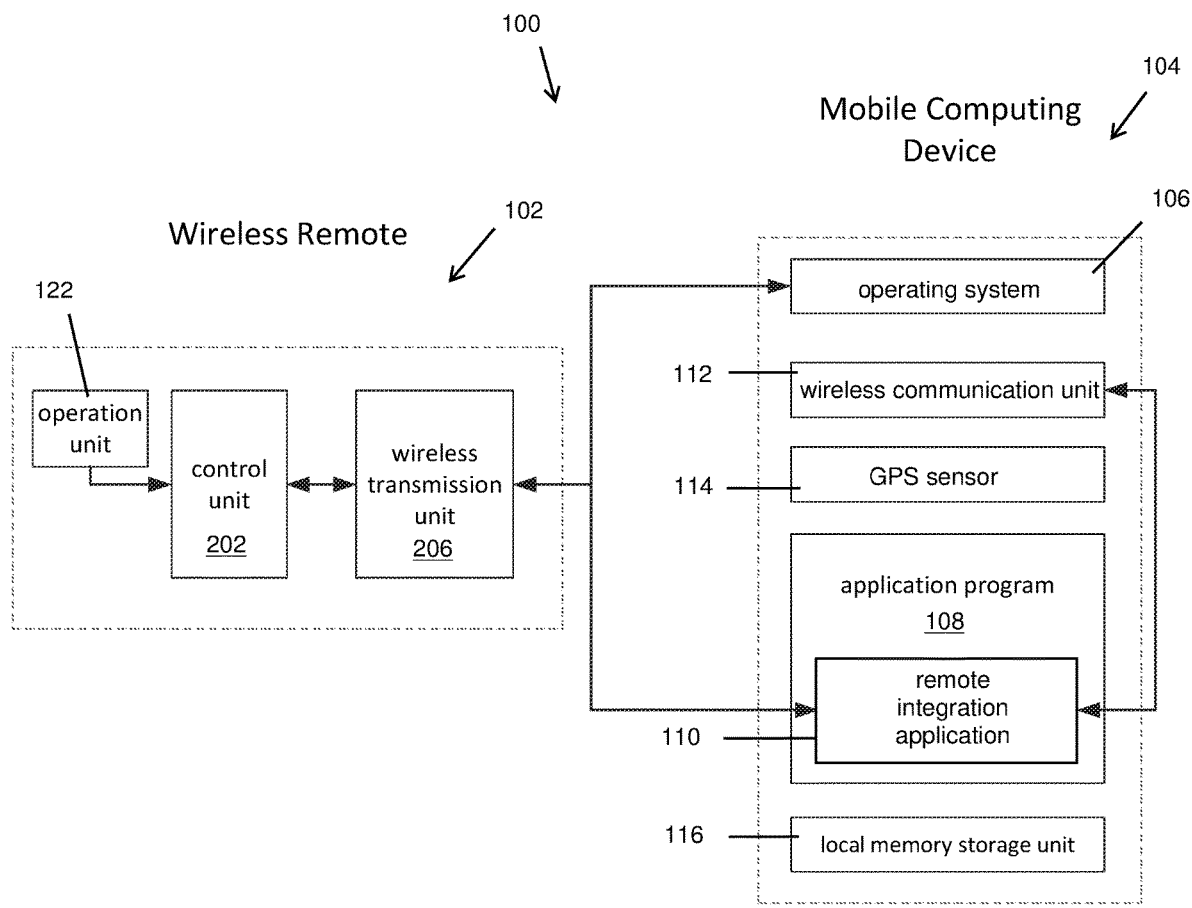
FIG. 2 is another illustration of the GPS location system of FIG. 1.
Figure 3:
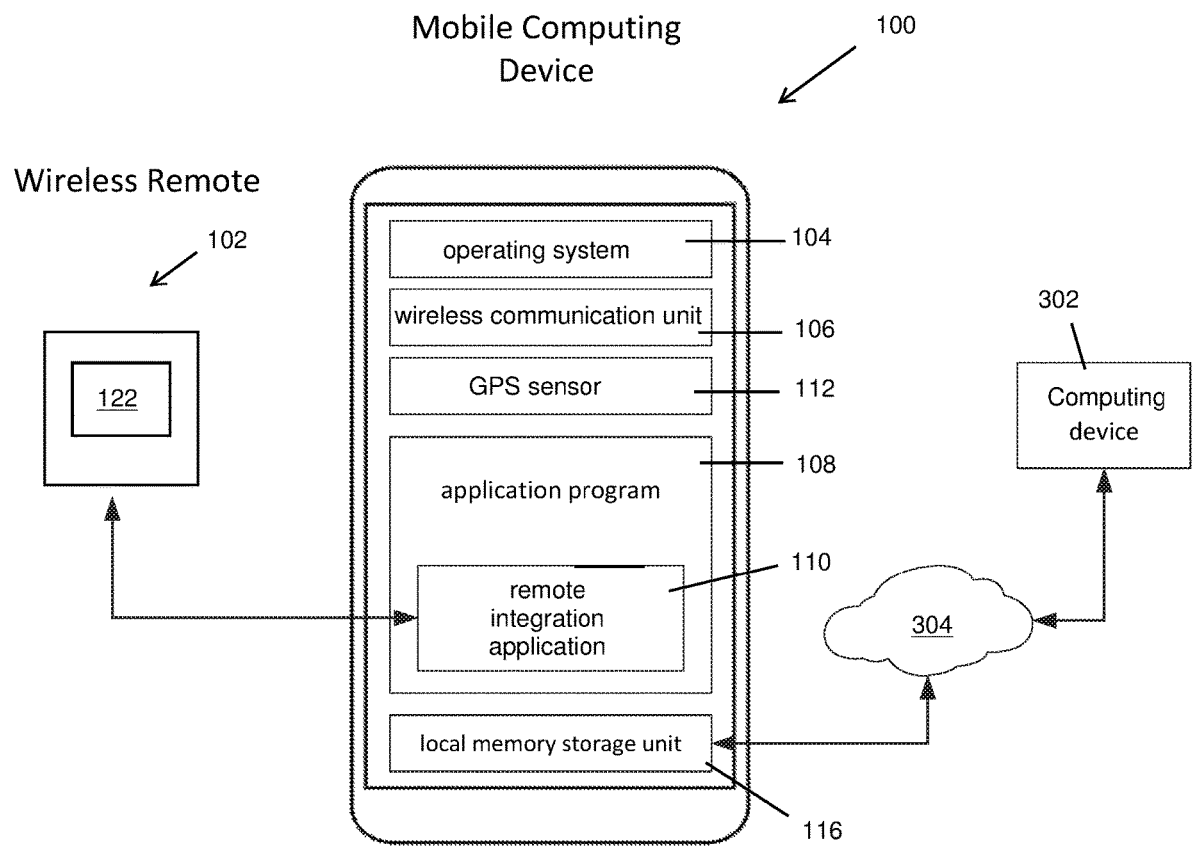
FIG. 3 is another illustration of the GPS location system of FIGS. 1 and 2, also illustrating a cloud based secured host.

As shown in FIGS. 1-3, in the illustrated example, the mobile computing device 104 is configured with an operating system 106 and at least one application program 108. The mobile computing device 104 may also include a remote integration application 110 that, as described more below, can be used to integrate the wireless remote 102 with the mobile computing device 104 to enable signals received from the wireless remote 102 to control one or more functions of the application program 108. The mobile computing device 104 also includes a wireless communication unit 112 112 for establishing a wireless communication link with another device, such as the illustrated wireless remote 102. The mobile computing device 104 also includes a GPS sensor 114 which can include hardware and software for determining a geographic location of the mobile computing device 104. The mobile computing device 104 can also include a local memory storage unit 116 which can be accessed by the application program 108 and operating system 106 to store information.

Wireless remote 102 includes a housing 120 and an operation unit 122 disposed on the housing. As described more below, operation unit 122 may be a button or other sensor for receiving a user input for generating a control signal, such as a control signal for instructing mobile computing device 104 to save a current geographic location. In the illustrated example, wireless remote 102 is designed as a very simple wearable device with a small form factor, and includes only one operation unit 122, e.g., only one button to provide a very easy to use device. Housing 120 may also include an attachment device 124 for attaching the remote 102 to a user, such as one or more of a clip for attaching the wireless remote to a user's clothing, and/or a lanyard, and/or a keychain loop. Thus, as described more below, wireless remote 102 may be a relatively small device with only one button 122 that can be attached to a user's hat or shirt or pants for easy access. A user engaged in an activity can quickly tap or press operation unit 122 to, for example, store a current location in mobile computing device 104 while using his/her other hand to continue to perform the activity, such as driving a vehicle such as a car, boat, or all-terrain vehicle, holding a fishing rod, etc. In other examples, wireless remote may include a plurality of operation units 122 and other features, such as a display, or microphone, as described more below.

As shown in FIG. 2, in the illustrated example, the wireless remote 102 includes a control unit 202 an operation unit 122 and a wireless transmission unit 206. The control unit 202 can be, for example, a microcontroller, a single chip, an embedded controller or a microprocessor and can be electrically connected with the operation unit 122 and the wireless transmission unit 206 through, for example, one or more of a wire, or a metal pattern on a circuit board, or a conductor, or some passive components, such as resistors, capacitors or inductors.

The operation unit 122 can be a button, an action sensing unit, a touch unit, a pressure sensing unit, or the like. The wireless transmission unit 206 is configured to send, and in some examples, receive, wireless control signals to/from the mobile computing device 104 wireless communication unit 112 and can be configured to support any of a variety of communication protocols, for example it may be a Bluetooth® transmission unit, or a Bluetooth® low energy transmission unit. The wireless transmission unit 206 is configured to be connected to the mobile computing device 104 by at least one wireless transmission protocol.

In one example, the wireless transmission unit 206 can send a unique wireless remote device ID stored on the wireless remote 102, e.g., in memory (not illustrated), in order to establish a connection with the mobile computing device 104 operating system 106 and application program(s) 108. Once the ID is verified, the operating system 106 can give permission to the control unit 202 for operating at least one function of the operating system 106 and/or one or more application programs 108 installed on the mobile computing device 104. Upon receiving permission, the control unit 202 may send control signals to the mobile computing device 104, which can be processed by the remote integration application 110 for controlling one or more functions of the application program 108. The ID can be verified by the remote integration application 110 by performing an authentication procedure through the wireless communication unit 112. After the authentication is completed, the operating system 106 and wireless communication unit 112 will regard the wireless remote 102 device as an authenticated wireless device unit, the wireless transmission unit 206 will establish a secured connection with the application program 108.

After the above-mentioned authentication procedure is completed, the remote integration application 110 can store the authentication result (e.g. the unique ID provided by the wireless remote 102) in the local memory storage unit 116. As a result, when the wireless remote 102 connects with the mobile computing device 104 again, the authentication procedure can be omitted. The local memory storage unit 116 can be a flash memory, a memory card, an optical storage medium, a hard disk, a solid-state disk (SSD) or the like.

After the wireless remote 102 is authenticated, the control unit 202 can transmit a control signal to the mobile computing device 104 through the wireless transmission unit 206, which can be received and processed, e.g., decoded or interpreted, by the remote integration application 110 to determine a corresponding instruction or operation for the application program 108. For example, the remote integration application 110 may be configured to communicate with a plurality of GPS applications. By being configured to communicate with a plurality of GPS applications, the wireless remote 102 can be used as a universal remote that may be used with any of a variety of mobile computing devices 104 and any of a variety of application programs 108. For example, a user may download or otherwise install the remote integration application 110 on the mobile computing device 104 and the remote integration application 110 can be configured to identify all GPS application programs 108 currently installed on the mobile computing device 104. In the event of more than one GPS application, the remote integration application 110 can prompt the user to select the GPS application he/she wishes to be controlled by the wireless remote 102. In yet another example, the remote integration application 110 may include a separate and distinct GPS application for displaying maps and recording waypoints, which may interface with the GPS sensor 114 and may also interface with an existing GPS application API, such as Google Maps® API for performing mapping and recording operations.

Upon receipt of a control signal from the wireless remote 102 and upon receipt of a user selection of a particular GPS program installed on the mobile computing device 104, the remote integration application 110 may be configured to determine identifying information associated with the GPS application. The remote integration application 110 may then be configured to determine, according to the identifying information, communication protocol information associated with the GPS application. For example, a waypoint command signal may vary depending on the particular GPS application. After determining the communication protocol information, the remote integration application 110 may be configured to process the control signal according to the accessed communication protocol to determine the at least one instruction for transmission to and control of the GPS application. Thus, the remote integration application 110 enables a single and universal control signal from the wireless remote 102 to control a plurality of different GPS applications. The communication protocol information may be stored in memory or accessed from a remote computing device, e.g., computing device 302 (FIG. 3).

After receiving the signal from the wireless remote 102 via the remote integration application 110, the application program 108 of the mobile computing device 104 can start a corresponding function according to the control signal. In one example, the application program 108 is a GPS navigation application and one function of the application is to determine current location information, such as GPS coordinates, associated with a current location of the mobile computing device 104 with the GPS sensor 114 and to save the location information to memory 116. In some examples, the current location information can also be displayed on a display screen (not illustrated) of the mobile computing device 104 and/or the wireless remote 102. The control unit 202 of the wireless remote 102 can be configured to transmit a control signal for receipt by the remote integration application 110, which can decode and/or convert the control signal into a corresponding instruction for the application program 108 for saving current location information.

In one example, the local memory storage unit 116 of the mobile computing device 104 further includes tables of captured information securely. As shown in FIG. 3, the application program 108 can connect to a cloud based secured host (computing device 302) via connection 304 (e.g., local area network, wide area network, and/or internet, etc. as is known in the art) and synchronize captured information to be accessed securely remotely, e.g., via an internet browser and/or remote integration application 110 and/or application program(s) 108.

In another example, the remote integration application 110 is configured to count the number of locations or waypoints marked by the wireless remote 102 via the. This counting feature may allow a user to count the number of fish caught or number of birds or animals seen or number of important locations saved during a trip or time period, e.g., 24-hour time period.

In another example, the remote integration program 110 is configured to send command signals to a plurality of application programs 108 installed on the mobile computing device 104. For example, in addition to communicating with a GPS navigation application, the remote integration application 110 can be configured to integrate the wireless remote 102 with social media applications to automatically send location information to social media contacts. Other applications can include voice recognition applications. For example, the wireless remote 102 may include a microphone (not illustrated) that a user can speak into to send voice commands or to transmit information about a current geographic location (for example the type and size of fish caught at a location). The voice data may be transmitted to the mobile computing device 104 for voice recognition processing and conversion to text data to be saved with the geographic location information. In one example, the wireless remote 102 may also have a display screen (not illustrated). The mobile computing device 104 may be configured to transmit the location information and additional text information to the wireless remote 102 for display on the wireless remote display screen for review by the user. In one example, the user may push the operation unit 122 to confirm the information is correct.

In another example wireless remote 102 may also include a GPS sensor (not illustrated) for determining a current geographic location. Such an embodiment may be useful for determining a more accurate geographic location than is possible with GPS sensor 114 of mobile computing device 104. For example, the mobile computing device 104 may have difficulty acquiring an accurate GPS location if it is stowed in a location that interferes with the radio signals required by GPS sensor 114. By separately providing a GPS sensor 114 on the wireless remote 102, the remote may also be configured with a more accurate GPS sensor. The control unit 202 of the wireless remote 102 may then transmit the location information determined by the wireless remote 102 GPS sensor to the mobile computing device 104 for processing by the remote integration application 110 and application program 108.

An example process for using a software application installed on mobile computing device 104 can include one or more of the following steps:
1. Wireless remote integration application 110 launched.
2. Create an Account by the following:
    (a) Create local account using Email Address and creating password. Complete registration required to be completed via App or Website.
    (b) Facebook® Account API—App will pull relevant personal information.
    (c) Google® Account API—App will pull relevant personal information.
3. Establish Bluetooth® Connection with Wireless remote 102 and/or setup programmability.
4. Wireless remote 102 set to trigger mode, App set to listen for trigger mode (waypoint signal, e.g., click of button).
5. Proceed to Map Screen which can use an existing GPS program API, e.g., Google Maps® API, for GPS location for Way Point and Real?time data.
6. Upon receipt of control signal from wireless remote 102 (trigger), App can capture Way Point (Longitude, Latitude) and Time/Date stamp.
7. Application can count and list the number of waypoints marked during a trip or 24-hour period.
8. Application may also count the number of animals or things marked at a certain location or way point during the trip or 24-hour period.
9. App can continue to listen for additional way point signals from wireless remote 102
10. Upon completion, an option can be given to do one or more of the following:
    (a) Delete—for deleting the most recently captured Way Point.
    (b) Add Details—In one fishing-focused application, one or more of the following can be added:
        (a) Location Name/Title
        (b) Description
        (c) Fish Type
        (d) Sporting equipment information (e.g., Lure Used)
        (e) Lake
        (f) Conditions
    (c) Add Picture—Access to the mobile device's camera to capture a picture of the experience and link it with the current location.
    (d) Save For Later—Allow the end?user to save the current Way Point with a generic name (Provided by App ?i.e. Way Point 12). End?user can access the information at a later date or online using the secured website.
11. All information can be stored securely on the local mobile device 104 with background services and sync'd securely to cloud base database (e.g. computing device 302) using a custom web service which can establish a secured connection between the mobile device App and the Cloud Database. Sync can occur via WiFi or Cellular Data packets.
12. Information can be accessible via dedicated secured website and/or secured mobile App.

In another example, a process for using a software application installed on mobile computing device 104 after a user has registered an account and is using the application a subsequent time can include one or more of the following steps:
1. Upon relaunch of Wireless remote integration application 110.
2. Login information can be securely accessed using credentials stored on mobile device 104 and/or login using credentials authenticated via Web Service to secured cloud database.
3. Establish wireless Connection with Wireless remote 102 and/or setup programmability.
4. Wireless remote 102 set to trigger mode, App set to listen for trigger mode (waypoint signal, e.g., click of button).
5. Window opens to list of past locations with the following options:
    (a) Select Way Point—Way Point displayed on map with other Way Points captured on file.
    (b) Edit Way Point—This can allow the end?user to add missing information or pictures to Way Point saved.
    (c) Delete—Remove Way Point from list.
6. Once completed, the screen can proceed to Map Screen with Location marked and allow the end?user to remove or create new Way Point.

7. Wireless remote 102 click (trigger), App can capture Way Point (Longitude, Latitude) and Time/Date stamp.
8. Application can count and list the number of way points marked during a trip or 24-hour period.
9. Application may also be able to count the number of animals or things marked at a certain location or way point during a trip or 24-hour period.
10. App can proceed to listen for way point signal (trigger, or Wireless remote 102 Click).
11. Upon completion, an option can be given to do one or more of the following:
    (a) Delete—for deleting the most recently captured Way Point.
    (b) Add Details—In one fishing-focused application, one or more of the following can be added:
        (a) Location Name/Title
        (b) Description
        (c) Fish Type
        (d) Lure Used
        (e) Lake
        (f) Conditions
    (c) Add Picture—Access to the mobile device's camera to capture a picture of the experience and link it with the current location.
    (d) Save For Later—Allow the end?user to save the current Way Point with a generic name (Provided by App ?i.e. Way Point 12). End?user can access the information at a later date or online using the secured website.
12. All information can be stored securely on the local mobile device with background services and sync'd securely to cloud base database using a custom web service which can establish a secured connection between the mobile device App and the Cloud Database. Sync can occur via WiFi or Cellular Data packets.
13. Information can be accessible via dedicated secured website and/or secured mobile App.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of saving a current geographic location of a boat or fisherman with a wireless remote and a mobile computing device located on the boat or fisherman while fishing or boating, the wireless remote including an operation unit operably connected to a wireless transmission unit, the mobile computing device including a wireless communication unit, a GPS sensor, a memory, and a processor configured to execute a remote integration application and a GPS application, the method comprising:
    a user pressing the operation unit, wherein the operation unit includes a button or sensor disposed on a housing of the wireless remote;
    sending, with the wireless transmission unit, a control signal to the mobile computing device in response to the pressing the operation unit;
    receiving, with the wireless communication unit at the mobile computing device, the control signal;
    processing, with the remote integration application, the control signal to determine at least one instruction;
    performing the at least one instruction with the GPS application in response to the receiving of the control signal, wherein said performing includes:
        receiving, from the GPS sensor, GPS coordinates of a current location of the mobile computing device; and
        storing the GPS coordinates in the memory
    wherein the performing the at least one instruction with the GPS application further includes recording a number of times the control signal is received within a time period; and
    wherein the method further comprises displaying, with the mobile computing device and/or the wireless remote, the recorded number of times the control signal is received within a time period.

2. The method of claim 1, wherein the recorded number of times represent a number of fish caught.

3. The method of claim 2, further comprising, receiving a user annotation for annotating the GPS coordinates stored in memory, the user annotation including a type of fish, a description of fish, or information on sporting equipment used to catch the fish.

4. The method of claim 1, wherein the remote integration application is configured to communicate with a plurality of GPS applications, the method further comprising:
    identifying, with the remote integration application, identifying information associated with the GPS application;
    determining, according to the identifying information, whether the remote integration application is configured to communicate with the GPS application; and
    accessing communication protocol information associated with the GPS application in response to determining the remote integration application is configured to communicate with the GPS application;
    wherein the processing step includes processing the control signal according to the accessed communication protocol to determine the at least one instruction.

5. The method of claim 1, wherein the remote integration application is configured to communicate with a plurality of GPS applications, the method further comprising:
identifying, with the remote integration application, identifying information associated with the GPS application;
accessing communication protocol information associated with the GPS application;
wherein the processing step includes processing the control signal according to the accessed communication protocol to determine the at least one instruction.

6. A mobile computing device, comprising:
a wireless communication unit;
a processor;
a memory;
a global positioning system (GPS) sensor; and
a non-transitory machine-readable storage medium containing machine-readable instructions configured to cause the processor to perform operations comprising:
receiving, with the wireless communication unit, a control signal from a wireless remote;
processing, the control signal to determine at least one instruction;
performing the at least one instruction with a GPS application in response to the receiving of the control signal, wherein said performing includes:
receiving, from the GPS sensor, GPS coordinates of a current location of the mobile computing device; and
storing the GPS coordinates in the memory;
wherein the performing the at least one instruction with the GPS application further includes recording a number of times the control signal is received within a time period;
wherein the operations further comprise displaying, with the mobile computing device, the recorded number of times the control signal is received within a time period.

7. The mobile computing device of claim 6, wherein the recorded number of times represent a tally of a number of fish caught.

8. The mobile computing device of claim 7, wherein the operations further include, receiving a user annotation for annotating the GPS coordinates stored in memory, the user annotation including a type of fish, a description of fish, or information on sporting equipment used to catch the fish.

9. The mobile computing device of claim 6, wherein the operations further include:
determining identifying information associated with the GPS application;
accessing communication protocol information associated with the GPS application;
wherein the processing step includes processing the control signal according to the accessed communication protocol to determine the at least one instruction.

10. A wireless remote, comprising:
a wireless transmission unit;
an operation unit configured to generate an operation unit signal in response to a user input; and
a control unit configured to transmit, with the wireless transmission unit, a unique ID and a control signal to a mobile computing device in response to receipt of the operation unit signal,
wherein the unique ID and control signal are designed and configured to be processed by a remote integration application operated by the mobile computing device, the remote integration application configured, in response to the processing of the control signal to determine at least one instruction for a GPS application operated by the mobile computing device, wherein the at least one instruction includes storing GPS coordinates of a location of the mobile computing device, recording a number of times the control signal is received within a time period, and displaying, with the mobile computing device and/or the wireless remote, the recorded number of times the control signal is received within a time period.

11. The wireless remote of claim 10, wherein the operation unit includes a microphone configured to receive an audible voice command from the user for transmitting the at least one instruction to the GPS application.

12. The wireless remote of claim 10, further comprising a housing, wherein the operation unit includes a button or sensor disposed on the housing to record a physical touch from the user.

13. The wireless remote of claim 10, further comprising a housing, wherein the operation unit includes only one button or sensor disposed on the housing for recording a physical touch from the user.

14. The wireless remote of claim 13, wherein the wireless transmission unit is a Bluetooth® transmission unit, or a Bluetooth® low energy transmission unit.

15. The wireless remote of claim 10, further including a housing, wherein the housing includes an attachment device for attaching the wireless remote to a user.

16. The wireless remote of claim 15, wherein the attachment device includes a clip for attaching the wireless remote to a user's clothing, and/or a lanyard, and/or a keychain loop.

* * * * *